March 23, 1937. C. T. STEWART 2,074,974
GLORY HOLE
Filed Dec. 16, 1935 5 Sheets-Sheet 1

INVENTOR.
Charles T. Stewart
BY Corbett & Mahoney
ATTORNEYS.

March 23, 1937.  C. T. STEWART  2,074,974
GLORY HOLE
Filed Dec. 16, 1935  5 Sheets-Sheet 2

INVENTOR.
Charles T. Stewart.
BY Corbett + Mahoney
ATTORNEYS.

March 23, 1937.  C. T. STEWART  2,074,974
GLORY HOLE
Filed Dec. 16, 1935  5 Sheets-Sheet 3

INVENTOR.
Charles T. Stewart.
BY Corbett + Mahoney
ATTORNEYS.

March 23, 1937.  C. T. STEWART  2,074,974
GLORY HOLE
Filed Dec. 16, 1935  5 Sheets-Sheet 4

INVENTOR.
Charles T. Stewart
BY Corbett + Mahoney
ATTORNEYS.

March 23, 1937.  C. T. STEWART  2,074,974
GLORY HOLE
Filed Dec. 16, 1935  5 Sheets-Sheet 5

INVENTOR.
Charles T. Stewart.
BY Corbett + Mahoney
ATTORNEYS.

Patented Mar. 23, 1937

2,074,974

UNITED STATES PATENT OFFICE 2,074,974

GLORY HOLE

Charles T. Stewart, Newark, Ohio, assignor to A. H. Heisey & Company, Newark, Ohio, a corporation of Ohio Application December 16, 1935, Serial No. 54,543

12 Claims. (Cl. 49—57)

My invention relates to a glory hole. It has to do, more particularly, with a glory hole or finishing furnace for glassware which is used for fire-polishing the ware to remove mold marks or to finally shape the ware and polish it so as to give it the proper lustre.

Many types of glory holes or glassware-finishing furnaces have been developed and used in the past. In the past, it has been customary to use very large glory holes which were built in a certain part of the shop and could not be moved. Such glory holes have usually consisted of a large circular furnace having a plurality of openings spaced therearound through which a number of workmen could insert articles to be finished. Obviously, such a glory hole or furnace is very expensive to operate, even after it has been heated up to the proper temperature, and bringing the glory hole initially to the proper working temperature requires considerable fuel and considerable time. Also, it will be apparent that even though it is desired that one workman only use the glory hole, it is necessary to heat the entire large glory hole. Furthermore, such a glory hole could not be moved to various positions in the shop where it is needed most. With such a large glory hole, it has been difficult to bring it to a sufficiently high temperature and to maintain it at such a temperature. Prior art glory holes have also been possessed of many other undesirable features.

One of the objects of my invention is to provide a glory hole or glassware-finishing furnace which is comparatively small and very compact and is so constructed that it is portable so that it may be moved to various positions where the workers need it most.

Another object of my invention is to provide a glory hole of the type indicated which may be heated to the proper working temperature in a very short time and which may be easily maintained at the proper working temperature by using a minimum amount of fuel.

Another object of my invention is to provide a glory hole of the type indicated wherein the combustion is controlled in such a manner that it will be most effective and which is so constructed that there will be very little heat loss and it will retain the heat for a long period of time even after the fuel is shut off.

In its pereferred form my invention contemplates the provision of a glory hole which is mounted on a frame carried by wheels or rollers so that it may be moved to any desired position.
This glory hole embodies mainly a substantially cylindrical combustion chamber in which the article to be finished is adapted to be placed. Means is provided for injecting fuel tangentially into this chamber and for drawing it towards the front of this chamber so that the flame in the combustion chamber will swirl around in said chamber, and consequently around an article placed therein. I also provide means for injecting oil or other suitable substances into this chamber to aid combustion and to produce a carbon deposit of free carbon on the article which will serve as a lubricant to prevent the shaping tools, subsequently used, from marking the article. I also provide a chamber in front of the combustion chamber in which the greater portion of the snap or rod, that holds the article placed in the combustion chamber, will be disposed during the heating of the article, in order to keep the snap or rod warm so that when it is subsequently used for picking up hot articles, it will not cause breakage thereof.

The preferred embodiment of my invention is illustrated in the accompanying drawings wherein similar characters of reference designate corresponding parts and wherein:

Figure 11 is a diagrammatic view illustrating how the glory hole may be moved to various positions where needed.

With reference to the drawings, I have shown my apparatus as comprising a frame 1 which is fabricated of a plurality of angle irons in the manner indicated. This frame 1 is supported by a plurality of rollers or wheels 2 so that the entire apparatus is portable and may be moved from place to place wherever needed.

The glory hole embodies mainly a rear substantially cylindrical housing 3 which contains the heating chamber or combustion chamber and a forward substantially square housing 4 which contains a chamber in which the greater portion of the snap or rod, used in inserting an article into the combustion or heating chamber, will be normally disposed.

Figure 8:
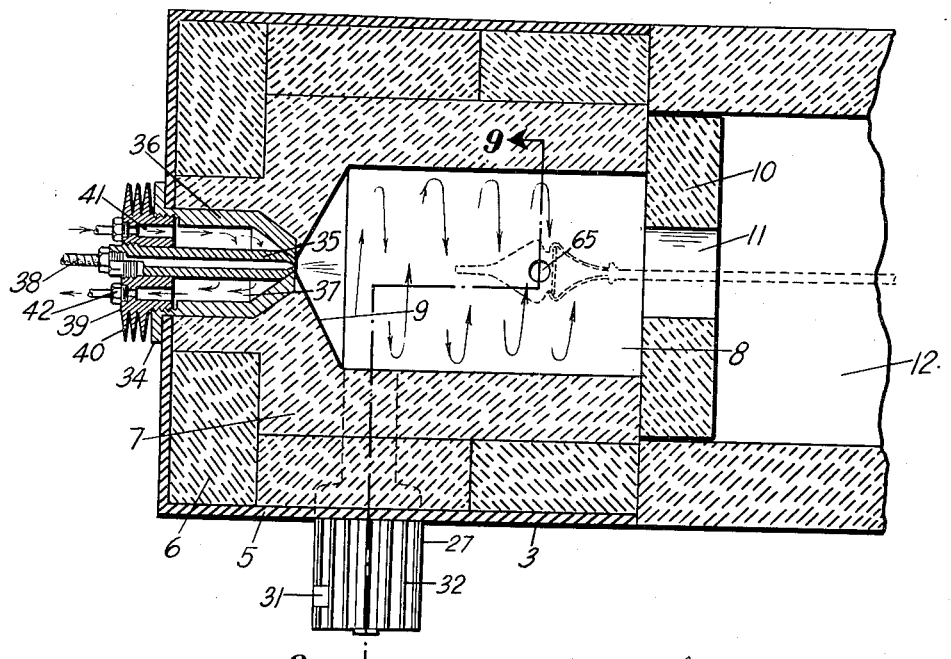
Figure 8 is a horizontal section taken substantially along line 8—8 of Figure 6 showing the inside of the combustion chamber and a part of the chamber disposed in front of the combustion chamber through which the snap or rod for holding the article passes.
Figure 9:
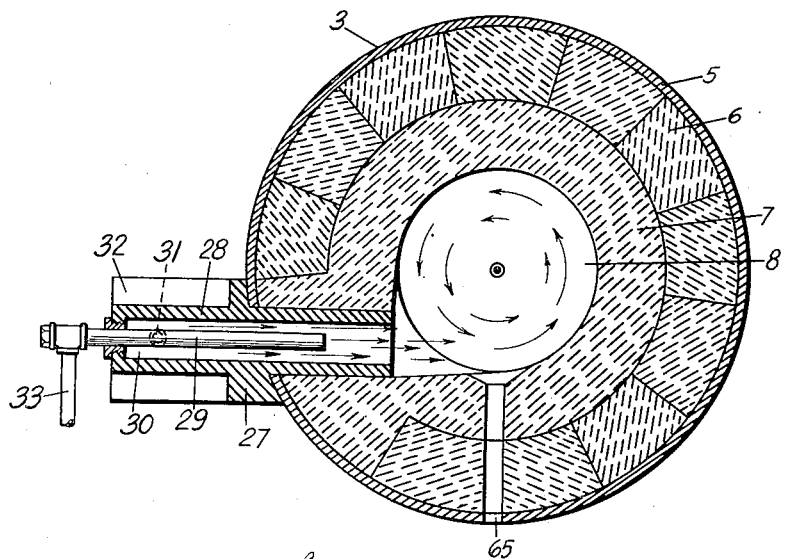
Figure 9 is a transverse section taken substantially on line 9—9 of Figure 8.
Figure 10:
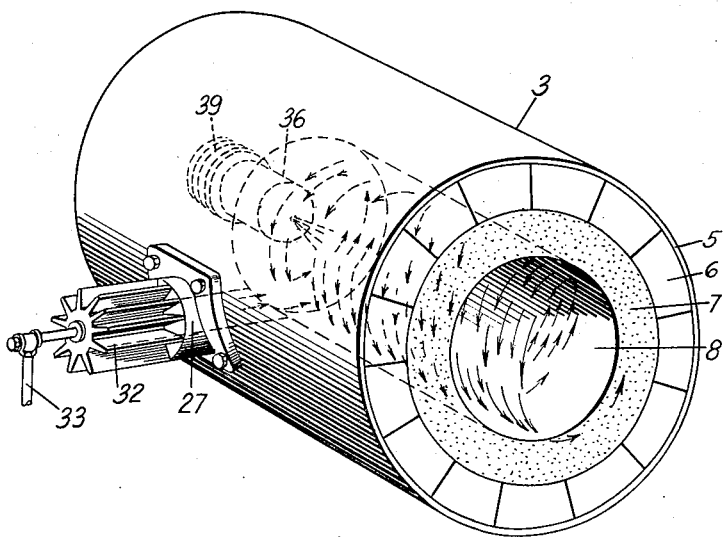
Figure 10 is a perspective view of the cylindrical heating or combustion chamber.

The housing 3, as shown best in Figures 8, 9 and 10, comprises an outer substantially cylindrical shell 5 made of steel or other suitable metal. Within this steel shell is disposed a lining 6 of insulating fire brick. Within the lining 6 of fire brick, a lining 7 of fire clay, which will not deteriorate because of the high heat, is disposed. This lining is preferably of a suitable material that will absorb the heat so that it will become heated quickly and will retain the heat for a long time but will not be readily deteriorated by the heat. It will be noted that a substantially cylindrical heating or combustion chamber 8 is formed within the lining 7. This chamber has its rear end of substantially conical form, as indicated at 9. The forward end of this chamber is open but is partly closed by a block 10 of refractory material having an opening 11 through which the article may be passed into the combustion chamber 8.

Figure 1:
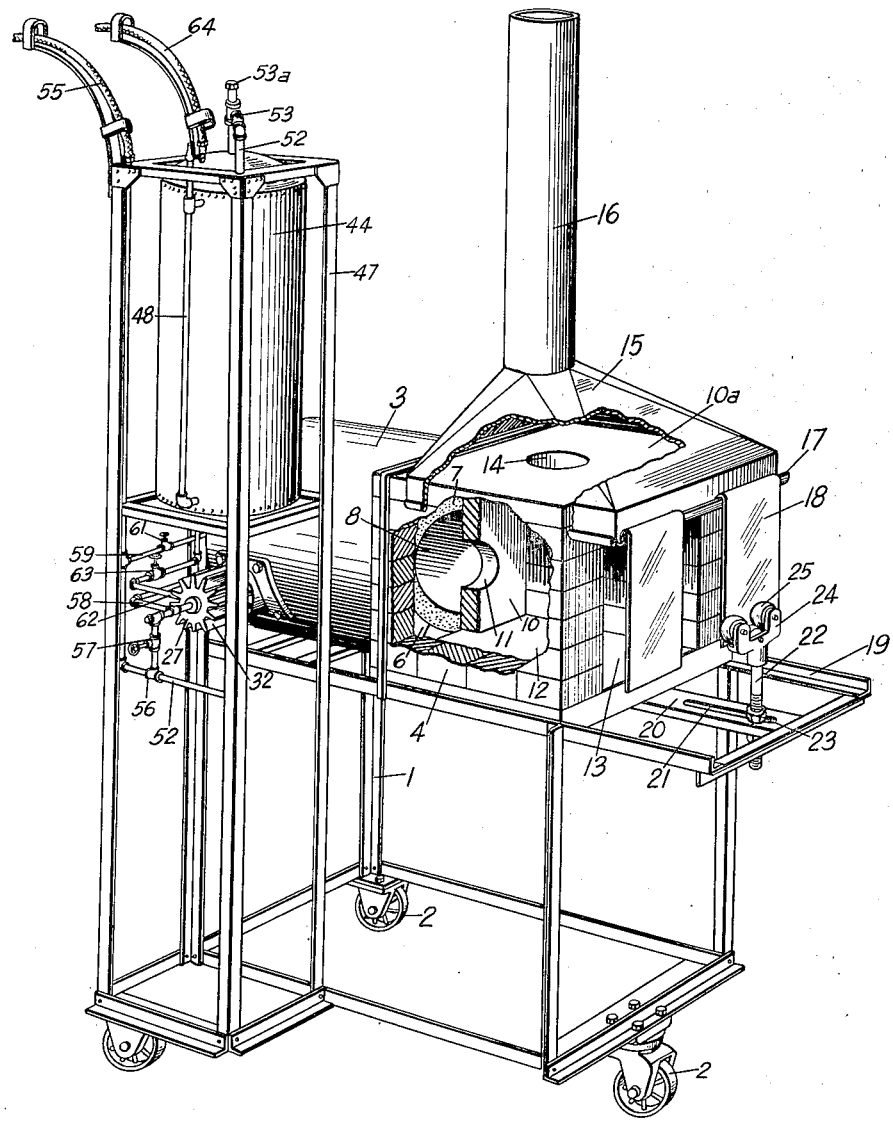
Figure 1 is a perspective view, partly broken away, of a portable glory hole constructed in accordance with the principles of my invention.
Figure 2:
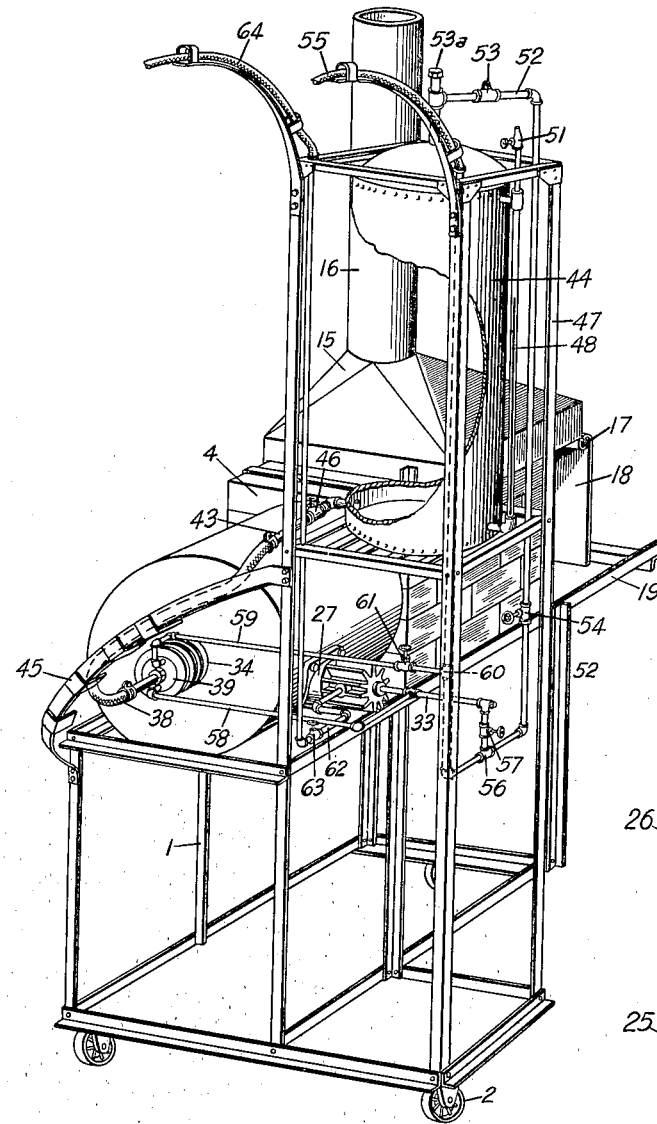
Figure 2 is a perspective view of the apparatus shown in Figure 1 but showing the rear side thereof.
Figure 3:
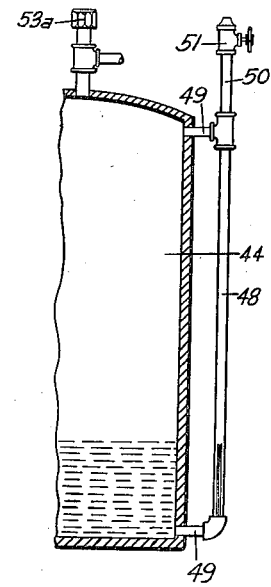
Figure 3 is a detail showing a portion of the tank for containing the oil and showing the gauge associated therewith.
Figure 6:
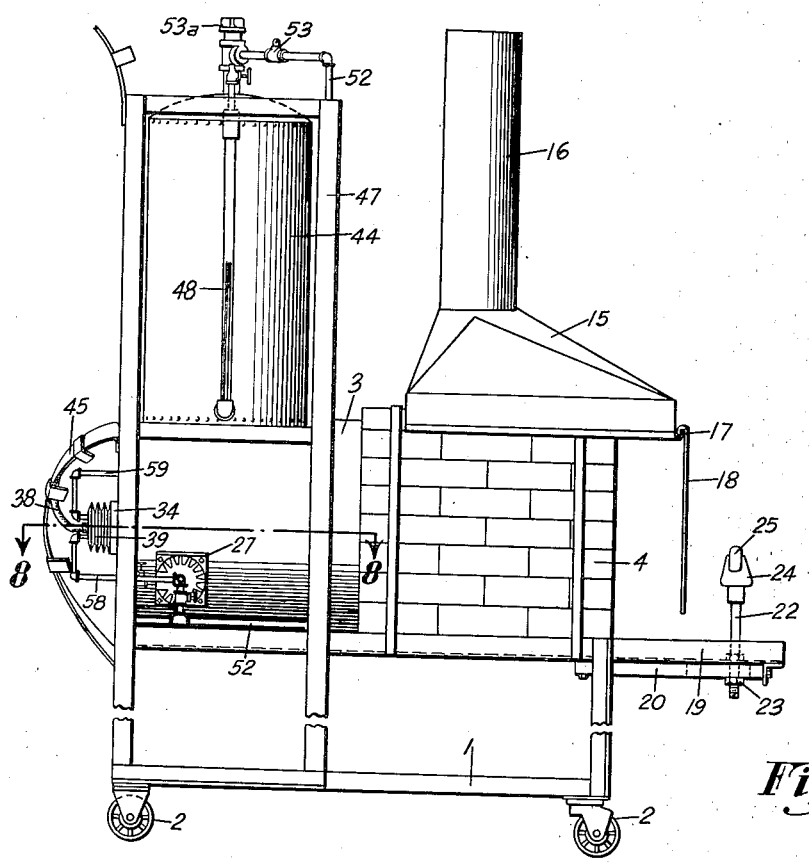
Figure 6 is a side elevation of the apparatus shown in Figures 1 and 2.
Figure 7:
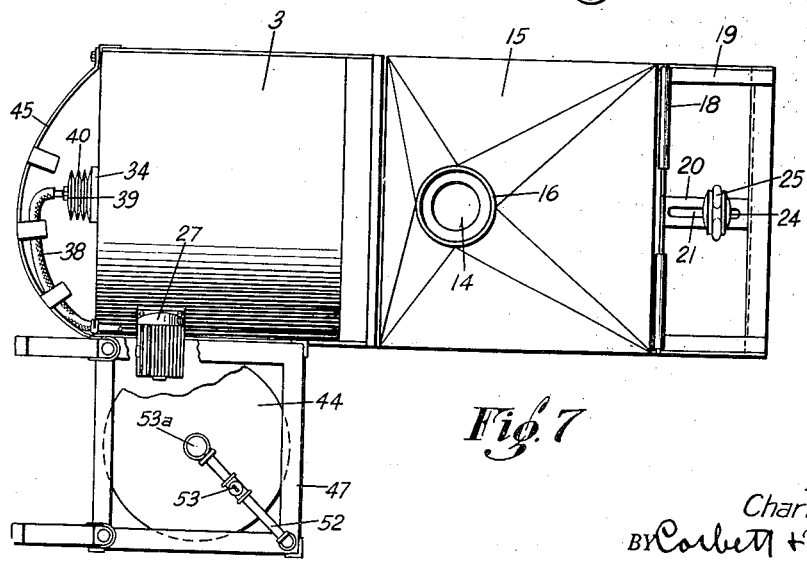
Figure 7 is a plan view of the apparatus shown in Figure 6.

The housing 4 is constructed of fire brick and has a substantially square chamber 12 formed therein, as indicated best in Figure 1. The front end of this chamber is open as indicated at 13 and the rear end is in communication with the combustion chamber 8 by means of the opening 11 in the block 10. The top of this chamber is substantially closed by means of a block 10a of refractory material which, however, has an outlet opening 14. A metal hood 15 is disposed on top of the housing 4. This metal hood has a stack 16 leading upwardly therefrom. As indicated best in Figure 6, the hood projects a substantial distance forwardly past the forward end of the housing 4 so that most of the gases or products of combustion that pass out of the forward open end of the chamber 12 will be drawn up into the hood 15. It will be noted that because the forward end 13 of chamber 4 is open, the refractory block 10 may be removed from the chamber 12 and replaced, if desired. I preferably provide several of these refractory blocks having openings 11 of various sizes formed therein. Thus, this refractory block 10 may be removed and replaced with a similar block having a different sized opening depending upon the size of the article to be inserted into the combustion chamber. The forward edge of the hood 15 is turned upwardly as at 17 so that a pair of protecting shields 18 of metal may be hung therefrom. These shields have their upper edges curled to cooperate with the portion 17 of the shield. They may be adjusted towards or away from each other and should be adjusted so that the space between them is just sufficient for the article to be passed therebetween. These shields are adapted to protect the operator from blasts of flame or heat which might emerge from the open end 13 of the chamber 12.

Figure 4:
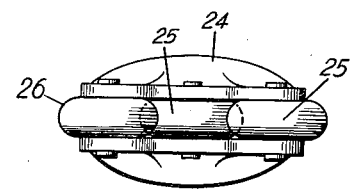
Figure 4 is a detail in plan elevation showing a cradle or support for the snap or rod used to hold the article when inserting it into the glory hole.
Figure 5:
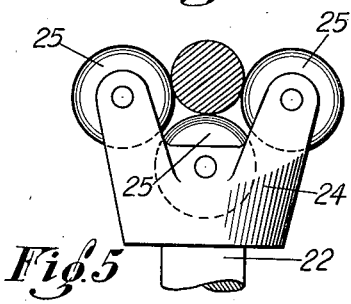
Figure 5 is a front elevation of the structure shown in Figure 4.

An extension 19 of the frame extends forwardly substantially at the level of the bottom of the housing 4. This extension includes a plate 20 having a slot 21 formed therein. This slot receives the lower end of a threaded stem 22 having a pair of nuts 23 threaded thereon. It will be apparent that the stem may be adjusted to various positions along the slot. It may also be adjusted vertically. The stem 22 is adapted to carry a cradle structure 24 on its upper end upon which the snap or rod for holding the article may be rested. Such a snap or rod is illustrated by the dotted lines in Figure 8. The cradle structure 24 is shown best in Figures 4 and 5 and embodies three rollers 25 arranged as indicated and upon which the snap rests so that it may be readily rotated. The rollers have their peripheries curved transversely as at 26 so that the snap or rod may be rocked vertically or laterally when disposed in the cradle formed by the said rollers.

I preferably employ gas as the fuel for heating the glory hole. A mixture of gas and air is injected into the combustion chamber 8 in such a manner that it will be most effective and will require a minimum amount. Thus, adjacent the rear end of the combustion chamber 8 to one side and adjacent the bottom thereof I provide a blast burner 27. This burner is so disposed that the gas and air mixture which it supplies will be injected substantially tangentially into the combustion chamber 8 as indicated in Figure 9. The burner 27 embodies an outer sleeve 28 and an inner smaller tube 29 which is disposed centrally therewithin. The tube 29 is of such a size relative to the sleeve 28 that an annular space 30 is produced between these two members. The inner end of the sleeve 28 is completely protected by the lining material 7 which entirely surrounds it, as indicated in Figure 9. A gas supply duct 31 leads transversely into the outer end of the tube 28. The sleeve 28 of the burner is cooled by a plurality of heat-radiating fins 32 which extend radially from the outer end thereof. The tube 29 terminates within the inner end of the sleeve 28 and projects rearwardly from the outer end thereof where it is attached to an air supply pipe 33. The pipe 33 is adapted to contain air under considerable pressure.

It will be apparent that in operation the air under pressure will flow through the tube 29 of the blast burner and as it is discharged therefrom it will draw with it the gas which enters the chamber 30 by the duct 31. In other words, an inspirator action is set up. This will bring about thorough mixing of the gas and air and, consequently, thorough combustion will be brought about. However, it is apparent that the tube 29 could be used for discharging gas under high pressure and the duct 31 could be connected to an air line containing air not under any considerable pressure. A similar inspirator action would be set up wherein the high pressure gas would draw in the low pressure air and the two would be thoroughly mixed. It will be apparent that the blast burner 27 discharges its air and gas mixture tangentially into the combustion chamber 8 at the rear end thereof and this will cause the products of combustion and the flame to swirl around in the chamber 8.

I provide an oil burner or injector 34 for injecting oil into the rear end of the combustion chamber 8. This oil burner or injector embodies an inner nozzle member 35 and an outer sleeve member 36 which is of larger diameter so that an annular space 37 is formed between these two members. The oil is adapted to be conducted to the nozzle member 35 by a flexible conduit 38 connected to the rear end thereof. The forward end of the nozzle member has a very small opening so that the oil will be discharged therefrom in the form of a small jet or spray. The sleeve member 36 is completely surrounded by the lining 7 so that it will be completely protected. The outer end of the sleeve member 36 has a member 39 threaded therein which carries the nozzle member. This member has a plurality of annular cooling fins 40 formed thereon for aiding in cooling the nozzle member and the sleeve 36. The oil burner is adapted to be cooled also by air which enters the annular chamber 37 through a duct 41 formed in member 39 and leads through a duct 42 formed in said member.

The flexible conduit 38 for supplying oil to the oil burner extends from the burner to a pipe 43 connected to the lower end of an oil tank 44. The flexible conduit 38 is secured to a curved bar 45, attached to the frame 1, which is curved outwardly from the housing 3 so that the conduit 38 will be spaced from the housing and there will be no danger of it being injured by the heat. The pipe 43 is connected to the tank 44 at the bottom thereof and has a control valve 46 interposed therein. The tank 44 is supported a considerable distance above the oil burner 34 on an extension 47 which projects upwardly from the frame 1.

I provide a gauge for indicating the amount of oil in the tank 44 at any time. This gauge embodies a transparent tube 48 which is in communication with the interior of the tank by means of ducts 49 disposed adjacent the upper and lower ends thereof. An extension 50 is provided on the upper end of the gauge having an air escape valve 51 disposed thereon. When the container or tank 44 is being filled with oil, this valve may be opened to permit escape of air from the tank during the filling operation. This will permit the tank to be readily filled with oil. It will be noted that this valve is disposed at a point higher than the extreme upper end of the tank. The top of the tank 44 has a pipe 52 connected thereto. This pipe 52 is the main air line containing a supply of air under considerable pressure. A check valve 53 is provided in this line adjacent the tank which is of such a type that it will permit the air under pressure to flow into the tank but will prevent any oil from backing up from the tank into the air line. Thus, air under pressure will always exert a downward force on the oil within the tank and will cause it to feed positively from the bottom of the tank, regardless of the amount of oil in the tank, through the conduit 38 to the oil burner or injector 35. The tank may be filled by removing cup 53a and during filling check valve 53 will prevent the oil from entering the air line 52.

The line 52 extends from the upper end of the tank downwardly to a point substantially level with the blast burner 27, then horizontally and then upwardly again to a point adjacent the upper end of the tank. The downwardly extending portion of this line has a control valve 54 interposed therein for controlling the flow of air to the tank. The upwardly extending branch of the pipe 52 is connected to a flexible hose 55 which is connected to a suitable source of air under pressure. The pipe 33 that is connected to the tube 29 of the blast burner 27 is connected to the horizontal portion of the pipe 52 as at 56. A valve 57 is provided for controlling flow of air from the pipe 52 into pipe 33. A pipe 58 connects the pipe 33 to the outlet 42 of the chamber 37 formed in the oil burner or injector and a pipe 59 connects the inlet opening 41, leading into this chamber, to the upwardly extending portion of the pipe 52 as at 60. A valve 61 is provided in pipe 59 for controlling flow of air from the pipe 52 into and through this pipe 59.

A pipe 62 is connected to the duct 31 of the blast burner 27 for supplying gas to the burner. This pipe 62 has a valve 63 disposed therein for controlling flow of gas to the burner. This pipe 63 extends upwardly to the top of the extension 47 of the frame and is connected to a flexible hose 64 which is connected to a suitable source of gas. Since the air supply line 52 is connected to a source of supply by the flexible conduit 55 and since the gas supply pipe 63 is connected to a source of supply by the flexible hose 64, it will be apparent that the entire apparatus may be moved without interrupting operation thereof.

The valve 57 is normally closed so that the air will flow from line 52 through line 59 past valve 61, which is normally open, and through this line 59 into the annular chamber 37 surrounding the nozzle of the oil burner or injector. The cool air will circulate through this chamber and cool the oil burner and will leave through the outlet 42, pass through the pipe 58 and into the pipe 33 through which it will flow into the tube 29 of the blast burner. It will be apparent that as the air passes through the chamber 37 of the oil burner it will absorb heat and, consequently, will become pre-heated. This pre-heated air that is supplied to the blast burner will facilitate and aid combustion. If desired, the valve 61 could be closed and the valve 57 could be opened. Then the air under pressure would flow from the line 52 past valve 57 into the pipe 33. The air rushing through pipe 33 would create suction in the line 58 which would draw the heat from the chamber 37 of the oil burner or injector. Thus, the oil burner may either be cooled by air circulating through the cooling chamber or by creating a vacuum for withdrawing the heat therefrom.

In the operation of this device a snap or rod having means for gripping the article is used for positioning the article in the combustion or heating chamber 8. The workman extends this snap or rod through the forward chamber 12 and through opening 11 in block 10 so as to position the article in the forward end of chamber 8, as indicated in Figure 8. The gas and air mixture is injected tangentially into the rear end of the combustion chamber 8 by means of the blast burner 27. As it enters the combustion chamber it ignites and the flames and other products of combustion swirl around in the combustion chamber. Because the air and gas mixture is injected tangentially into the combustion chamber the flames and products of combustion will hug the walls of the combustion chamber as they swirl around therein. Simultaneously during the swirling motion of the flames and products of combustion, they are caused to move forwardly through the combustion chamber. In other words, the flames and products of combustion follow a helical path through the combustion chamber. The flames and products of combustion are drawn forwardly by means of the flue or stack above the chamber 12. They are drawn forwardly through the combustion chamber, through opening 11, through chamber 12, up through opening 14 and finally into the stack 16.

During the injection of the air and gas mixture into the rear end of the combustion chamber, oil is also injected by means of the injector or burner 34. It will be noted that the oil is sprayed or injected above the point where the air and gas mixture comes into the combustion chamber. The oil ignites and burns and gives the proper flame condition for polishing. It has been found that a quicker polish may be obtained by the use of this oil spray than by the use of gas and air alone. It is believed that the oil gives a proper oxidizing flame and prevents any burning of the color from the glass. It also gives a certain percentage of free carbon which deposits on the glassware and this forms a lubricant for further working of the glass so that no marks are left on the glass by the tools employed. Other substances which when ignited form products of combustion containing free carbon particles may be employed in place of oil.

It will be noted that the oil is injected substantially at right angles to the blast of air and gas. Consequently, the oil will be effectively mixed with the air and gas stream and will be carried with said stream. It will also be noted that the air and gas stream enters the combustion chamber at the rear end thereof a considerable distance behind the point where the article is usually disposed. This will tend to preclude melting of the article out of shape which would occur if the article was positioned directly adjacent the blast burner. The use of a swirling flame causes the flame to hug the walls of the combustion chamber and to thereby keep the walls heated better. It also causes the flame to wrap around every surface of the article being polished or finished. I preferably provide a glass drain 65 in the bottom of the combustion chamber to permit broken glass articles to melt and drain out of combustion chamber.

When the workman is holding the article in the heating chamber, he may rest the outer end of the snap on the cradle formed by the rollers 25. The snap may be readily rotated while resting on this cradle or may be rocked in any direction. The snap or rod will extend through the chamber 12 so that it will always be kept warm because the flame and products of combustion are drawn through this chamber during passage to the stack. This is important because if the snap is not kept warm, when it is used in subsequently gripping warm articles it will cause breakage thereof. The shields 18 will protect the workman from blasts of flame or heat coming out of the chamber 12 through the forward open end 13. Part of the flame and heat emerging through this open end will be drawn up through the extension of the hood 15 that projects outwardly over the forward end of the housing 4. The outer chamber 12 also prevents cold drafts from passing into the combustion chamber and hitting the article which might cause breakage thereof. While the article is in the combustion or heating chamber it is preferably revolved in order to keep it in shape and give it a uniform polish.

After the furnace is once heated, the amount of fuel supplied thereto may be reduced materially since only a small amount of fuel will be required to maintain the temperature. When the walls of the combustion chamber are once heated, they retain the heat for some time. Also, because the combustion chamber is fairly small and because of the nature of the walls, it may be brought initially to the proper temperature very quickly.

Figure 11:
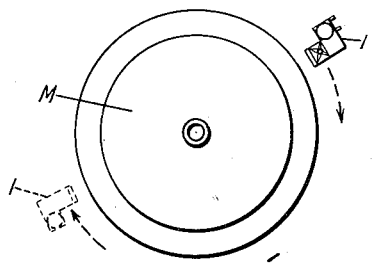

In Figure 11 I illustrate diagrammatically how my device may be readily moved around a melting furnace M from which workmen withdraw the molten glass in order to initially shape the glass article. Then the article is subsequently placed in my device for the finishing operation.

It will be apparent from the above description that I have provided a glory hole having many desirable features. It is very compact and is so constructed that it is portable so that it may be moved to various positions where the workmen need it most. It may be heated to the proper working temperature in a very short time and may be maintained easily at the proper working temperature by the use of a minimum amount of fuel.

Because of the fact that the refractory block separating the combustion chamber from the forward chamber is removable, it may be replaced when desirable with a block having a different sized opening formed therein. This makes it possible to have a block at all times with an opening of a size which is proper for the particular article being heated in the combustion chamber.

It will be understood that although in the preceding description and the following claims I specify that oil is injected into the combustion chamber, I also intend to cover other hydrocarbon fuels of a similar nature which may be used to produce a deposit of carbon on the article and to perform the other stated functions.

Having thus described my invention, what I claim is:

1. In a glory hole of the type described, a substantially cylindrical combustion chamber having an opening in its forward end through which a glass article may be passed thereinto, means for injecting fuel into said combustion chamber adjacent the rear end thereof substantially tangential to the walls thereof so as to cause swirling of the products of combustion of the fuel therein, and means for simultaneously drawing the products of combustion forwardly through the combustion chamber so as to cause the products of combustion to travel towards said opening in a helical path in said combustion chamber for the entire length thereof.

2. In a glory hole of the type described, a substantially cylindrical combustion chamber having an opening in its forward end through which a glass article may be passed thereinto, means for injecting fuel into said combustion chamber adjacent the rear end thereof substantially tangential to the walls thereof so as to cause swirling of the products of combustion of the fuel therein, means for simultaneously drawing the products of combustion forwardly through the combustion chamber towards said opening so as to cause the products of combustion to travel the length of the combustion chamber in a helical path, and means for injecting oil into said combustion chamber.

3. In a glory hole of the type described, a substantially cylindrical combustion chamber, a burner for injecting fuel into said combustion chamber adjacent the rear end thereof substantially tangential to the walls thereof so as to cause swirling of the products of combustion of the fuel therein, an oil injector disposed at the rear of the combustion chamber for injecting oil thereinto substantially at right angles to the path of fuel injected by said burner, and means for simultaneously drawing the products of combustion forwardly through the combustion chamber so as to cause the products of combustion to travel the length of the combustion chamber in a helical path.

4. In a glory hole of the type described, a combustion chamber, means for injecting fuel into said combustion chamber, a chamber disposed adjacent the forward end of the combustion chamber, and a refractory block for separating the two chambers, said refractory block having an opening through which the article may be passed into the combustion chamber, said refractory block being removable so that it may be replaced with a similar block having an opening of different size formed therein.

5. In a glory hole of the type described, a combustion chamber, means for injecting fuel into said combustion chamber, a chamber disposed adjacent the forward end of the combustion chamber, a wall for separating the two chambers having an opening formed therein, said second chamber having a stack in communication therewith, the forward end of said second chamber being open, protecting shields disposed in front of said forward open end, and a cradle member disposed in front of said second chamber for supporting a snap or rod used for holding the article to be heated in the combustion chamber.

6. In a glory hole of the type described, a substantially cylindrical housing having a substantially cylindrical combustion and heating chamber formed therein, means for injecting fuel into said combustion chamber, means for injecting oil into said combustion chamber, an oil tank for supplying oil to said oil injector, a substantially rectangular housing disposed in front of said cylindrical housing and having an auxiliary heating chamber formed therein which is in communication with said combustion and heating chamber, said auxiliary heating chamber having a stack in communication therewith, all of said members being carried by a frame mounted on transporting means so that the entire glory hole is portable.

7. In a glory hole of the type described, a combustion chamber, means for injecting fuel into the combustion chamber, means for injecting oil into the combustion chamber, a tank for containing oil to be supplied to said last-named means, and means for maintaining air pressure on the oil within the tank.

8. In a glory hole of the type described, a combustion chamber, means for injecting fuel into said combustion chamber, a chamber disposed adjacent the forward end of the combustion chamber, a wall for separating the two chambers having an opening formed therein, a hood for covering the second-named chamber being in communication therewith, a stack leading from the hood, said hood extending forwardly a substantial distance over the forward end of said second chamber.

9. In a glory hole of the type described, a substantially cylindrical combustion chamber having an opening in its forward end through which a glass article may be passed thereinto, means for injecting fuel into said combustion chamber substantially tangential to the walls thereof so as to cause swirling of the products of combustion of the fuel therein, an auxiliary chamber disposed in front of said cylindrical combustion chamber and being in communication therewith by said opening, and means for drawing the products of combustion forwardly through the combustion chamber so as to cause them to travel in a helical path, for drawing them through said opening into said auxiliary chamber and then upwardly through said chamber, said means comprising a stack in communication with the upper end of said auxiliary chamber, said auxiliary chamber having an opening in its forward end through which a snap carrying the glass article may be passed, said chamber being adapted to keep the snap warm and to protect the combustion chamber from drafts.

10. In a glory hole of the type described, a substantially cylindrical combustion chamber having an opening in its forward end through which a glass article may be passed thereinto, means for injecting fuel into said combustion chamber substantially tangential to the walls thereof so as to cause swirling of the products of combustion of the fuel therein, an auxiliary chamber disposed in front of said cylindrical combustion chamber and being in communication therewith by said opening, said auxiliary chamber having an opening in its forward end through which a snap carrying the glass article may be passed, said chamber being adapted to keep the snap warm and to protect the combustion chamber from drafts.

11. In a glory hole of the type described, a substantially cylindrical combustion chamber having an opening in its forward end through which a glass article may be passed thereinto, means for injecting fuel into said combustion chamber substantially tangential to the walls thereof so as to cause swirling of the products of combustion of the fuel therein, and means for simultaneously drawing the products of combustion forwardly through the combustion chamber so as to cause the products of combustion to travel towards said opening in a helical path.

12. In a glory hole of the type described, a combustion chamber, a blast burner for supplying a mixture of air and gas to said combustion chamber, an oil burner for injecting oil into said combustion chamber, a cooling chamber surrounding said oil burner, means for circulating cooling air in said chamber to cool the oil burner, and means for conducting the air which is preheated in passing through said chamber to said blast burner so as to aid combustion of the mixture supplied to the combustion chamber by said blast burner.

CHARLES T. STEWART.